2,993,236
METHOD OF PRODUCING CORD-LIKE PRODUCT
Kenneth John Brimley, Stevenston, and Leslie Ernest Medlock, Seamill, Scotland, assignors to Imperial Chemical Industries Limited, Millbank, London, England, a corporation of Great Britain
Filed Aug. 29, 1957, Ser. No. 680,988
Claims priority, application Great Britain Sept. 7, 1956
8 Claims. (Cl. 18—59)

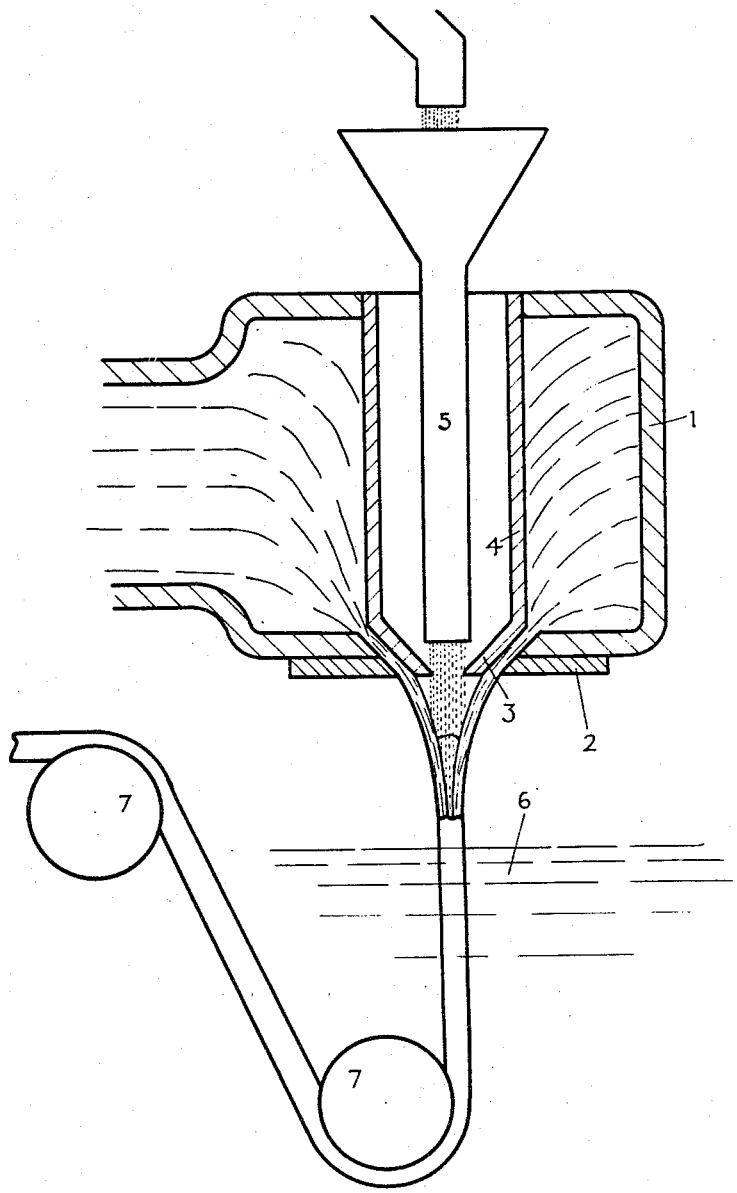

This invention relates to the manufacture of cord-like products of the kind having a core of solid material in discrete particle form ensheathed in a flexible covering. The invention is particularly applicable to the production of fuse cords.

Hitherto the manufacture of products as aforesaid has required the employment of a series of operations in which the sheath is built up in successive layers and, where necessary, a final reinforcing or protective coating applied. In the manufacture of for example detonating fuse cord the detonating explosive core is delivered in powder form to a tube which is formed by folding a paper ribbon about it and then reinforcing the paper tube so formed by spinning textile yarn about it, the resulting cord being treated with one or more waterproofing and reinforcing coatings.

The present invention permits cord-like products of the kind above referred to be produced more simply and cheaply than heretofore and the process can be operated more expeditiously than those previously employed.

In the process of the present invention discrete solid material, destined to form the core of the product, is conducted to an extrusion die assembly through which thermoplastic material, heated to its softening point, is extruded in tubular form; the discrete material is delivered in a stream to form a core in the continuously forming plastic tube and the tube ensheathing the core passes to a cooling zone. A tensile force is applied to the plastic tube whereby it is elongated and reduced in diameter after extrusion and before being set by cooling. At the point of formation the tube diameter is substantially larger than its eventual size. This facilitates the delivery of the core material to it and the subsequent elongation of the tube not only reduces it to its eventual diameter but helps to compact the core material within it.

The tubular sheath may be elongated by drawing it away from the die at a greater linear speed than that at which it is extruded through the die and it may pass around guide rollers and, if desired, between compacting rollers.

It has not been considered practicable, heretofore, to make say, a detonating fuse having a small diameter-core of pentaerythritol tetranitrate or cyclotrimethylene trinitramine enclosed directly in a sheath of thermoplastic composition since pentaerythritol tetranitrate melts at a temperature of 140° C. and cyclotrimethylene trinitramine at 195° C. whilst the extrusion temperature of suitable thermoplastic compositions is either higher than the melting point of the compound (for example polythene is suitably extruded at 180° C.) or else it is higher than the temperature to which the core forming compound could be safely exposed, and the small core diameter required (of the order of 3 mm.) has made it difficult to feed the explosive core material to a sheath of such narrow bore and satisfactorily to cool it. This problem is overcome in the present invention by forming the ensheathing tube with a larger initial diameter than that eventually required and reducing it to size by subsequent elongation before it sets and by cooling the member through which the core material is fed to the thermoplastic tube.

The invention is illustrated by the following example and the accompanying diagrammatic drawing. In the drawing 1 is an extrusion head for a thermoplastic resin, for example polythene, which includes a plate die 2, a pencil die 3, a pencil die holder 4 and a water-cooled core material feed tube 5. The extrusion die is fed with heated thermoplastic resin by a worm (not shown) and, at the same time, core material, for example pentaerythritol tetranitrate, in powder form is admitted to the feed tube 5 at the required rate. The hot extruded product is passed through a zone in which plastic elongation under tension can take place, for example through an air gap beyond the extrusion head, and thence to a water bath 6 in which it may pass over a series of rollers 7 before leaving the water bath for cooling in known manner. The drawing speed and extrusion (worm) speed are arranged to produce the required amount of plastic elongation and reduction in diameter; elongation takes place substantially prior to cooling in the water bath but a small further elongation may occur in the water bath since the cooling and setting of the polythene is not instantaneous. The position of the free level of discrete solid material being delivered to the thermoplastic sheath during the manufacturing process, has some influence on the diameter and density of the core; normally the level is held at a position intermediate of the surface of the water bath and the dies; the higher the level is allowed to rise, the larger will be the core diameter of the final product and the density of the core will also be increased to some extent.

Typical data of, say, detonating fuse having a core of pentaerythritol tetranitrate contained in a polythene sheath are as follows:

| | | |
|---|---|---|
| Bulk density of pentaerythritol tetranitrate | g./cc. | 0.94 |
| Plate die diameter | cm. | 1.52 |
| Pencil die diameter | cm. | 1.14 |
| Feed tube internal diameter | cm. | 0.64 |
| Feed tube external diameter | cm. | 0.89 |
| Draw speed | cm./sec. | 25.0 |
| Extrusion speed | cm./sec. | 5.0 |
| Distance between plate die and water level | cm. | 18.0 |
| Temperature of polythene at die | ° C. | 180 |
| Maximum temperature of pentaerythritol tetranitrate | ° C. | 25 |

By maintaining the free level of pentaerythritol tetranitrate at 2.5 cm. below the dies a detonating fuse of 0.51 cm. external diameter comprising 5.55 g./m. of pentaerythritol tetranitrate and 8.02 g./m. of polythene is obtained.

What we claim is:

1. A method of producing cord-like materials comprising a core of discrete particles of solid material contained in a flexible sheath, which comprises extruding at a diameter substantially greater than that desired for the cord-like material a sheath extensible while hot consisting essentially of a heat-softened thermoplastic resin, delivering a stream of a multitude of the discrete solid particles into the tube so formed, elongating and reducing the diameter of the tube before it sets, by drawing away the sheath at a linear speed greater than that at which it is extruded, thus forming a core of the solid material which has a diameter less than that of said stream and increasing the compactness of the core material, and then setting the sheath by cooling.

2. A method as claimed in claim 1 for producing a fuse cord, wherein the stream of discrete solid particles delivered to form the core consists of a fuse powder.

3. A method as claimed in claim 2 for producing a detonating fuse cord, wherein the stream of discrete solid particles delivered to form the core consists of particles of a high velocity detonating explosive.

4. A method as claimed in claim 2 wherein the high velocity detonating explosive is pentaerythritol tetranitrate.

5. A method as claimed in claim 2 wherein the stream of the fuse powder is delivered to the tube through a cooled channel.

6. A method as claimed in claim 1 wherein the thermoplastic resin composition is one comprising polythene.

7. A method of producing a cord-like material as claimed in claim 2 wherein the cooling of the sheath is assisted by drawing the tube through a water bath.

8. A method of producing a cord-like material as claimed in claim 1 wherein the core is further compacted by passing the cored tube through rollers after the sheath has been set by cooling.

References Cited in the file of this patent

UNITED STATES PATENTS

| | | |
|---|---|---|
| 1,887,446 | Vosa | Nov. 8, 1932 |
| 1,992,678 | Studt et al. | Feb. 26, 1935 |
| 2,257,222 | Bergmann | Sept. 30, 1941 |
| 2,380,312 | Johnson | July 10, 1945 |
| 2,493,143 | Ingels | Jan. 3, 1950 |
| 2,498,050 | Selvidge | Feb. 21, 1950 |
| 2,576,444 | Clinefelter | Nov. 27, 1951 |
| 2,687,553 | Colombo | Aug. 31, 1954 |
| 2,700,183 | Beare | Jan. 25, 1955 |
| 2,708,771 | Stoneback | May 24, 1955 |
| 2,888,740 | Danis | June 2, 1959 |